(12) United States Patent
Baehrle-Miller et al.

(10) Patent No.: US 8,942,906 B2
(45) Date of Patent: Jan. 27, 2015

(54) METHOD FOR ADJUSTING THE CLAMPING FORCE EXERTED BY A PARKING BRAKE, REGULATING AND CONTROL APPLIANCE FOR CARRYING OUT SAID METHOD, AND VEHICLE PARKING BRAKE COMPRISING SUCH A CONTROL APPLIANCE

(75) Inventors: Frank Baehrle-Miller, Schoenaich (DE); Dieter Blattert, Kirchheim/Neckar (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 13/820,210

(22) PCT Filed: Jul. 12, 2011

(86) PCT No.: PCT/EP2011/061810
§ 371 (c)(1),
(2), (4) Date: May 14, 2013

(87) PCT Pub. No.: WO2012/031797
PCT Pub. Date: Mar. 15, 2012

(65) Prior Publication Data
US 2013/0226426 A1    Aug. 29, 2013

(30) Foreign Application Priority Data

Sep. 10, 2010  (DE) .......................... 10 2010 040 563

(51) Int. Cl.
*B60T 7/12*  (2006.01)
*B60T 8/172*  (2006.01)
(Continued)

(52) U.S. Cl.
CPC ............... *B60T 8/172* (2013.01); *B60T 13/588* (2013.01); *B60T 13/745* (2013.01)

USPC ................... 701/70; 701/36; 303/10; 303/11; 303/28; 303/57

(58) Field of Classification Search
CPC ............... B60T 7/12; B60T 8/00; B60T 8/17; B60T 8/171; B60T 8/172; B60T 8/24; B60T 8/245; B60T 13/66; B60T 15/041; B60W 10/00; B60W 10/18; B60W 10/182; B60W 2510/18; B60W 2510/186; B60W 2710/18; B60W 2710/186
See application file for complete search history.

(56) References Cited

U.S. PATENT DOCUMENTS 7,121,633 B2 *  10/2006  Tachiiri et al. .................. 303/20
7,143,873 B2 *  12/2006  Pascucci et al. ............. 188/72.7
(Continued)

FOREIGN PATENT DOCUMENTS

CN    1479681    3/2004
CN    1874918    12/2006
(Continued)

OTHER PUBLICATIONS

International Search Report, dated Dec. 2, 2011, issued in corresponding PCT/EP2011/061810.

*Primary Examiner* — Jonathan M Dager
(74) *Attorney, Agent, or Firm* — Kenyon & Kenyon LLP

(57) ABSTRACT

In a method for adjusting the clamping force exerted by a parking brake, which force is applied by an electric-motor braking apparatus and a hydraulic braking apparatus, the electric braking motor impinging upon a brake piston of a hydraulic wheel brake unit of the hydraulic braking apparatus, for the case in which the pre-pressure existing in the hydraulic braking apparatus exceeds a threshold pressure value, an inlet valve in the braking circuit of the hydraulic braking apparatus is closed, and the target braking force is established by actuation of the electric-motor braking apparatus.

10 Claims, 2 Drawing Sheets

(51) Int. Cl.
*B60T 13/58* (2006.01)
*B60T 13/74* (2006.01)

(56) References Cited

U.S. PATENT DOCUMENTS

| | | | |
|---|---|---|---|
| 7,267,206 B2 | 9/2007 | Dupuis | |
| 7,992,691 B2* | 8/2011 | Maron et al. | 188/156 |
| 8,185,287 B2* | 5/2012 | Maron et al. | 701/70 |
| 8,255,136 B2* | 8/2012 | Bentner et al. | 701/70 |
| 8,296,029 B2* | 10/2012 | Watanabe et al. | 701/70 |
| 8,645,039 B2* | 2/2014 | Schneider et al. | 701/70 |
| 2001/0033106 A1* | 10/2001 | Shirai et al. | 303/177 |
| 2002/0100647 A1 | 8/2002 | Miyakawa et al. | |
| 2004/0113486 A1* | 6/2004 | Koga et al. | 303/20 |
| 2004/0113489 A1 | 6/2004 | Iwagawa et al. | |
| 2006/0006735 A1* | 1/2006 | Dupuis | 303/3 |
| 2007/0007817 A1* | 1/2007 | Nonaga et al. | 303/155 |
| 2007/0299566 A1* | 12/2007 | Goss et al. | 701/1 |
| 2008/0071457 A1* | 3/2008 | Shiraki | 701/70 |
| 2008/0086253 A1* | 4/2008 | Nakayama | 701/80 |
| 2008/0190720 A1* | 8/2008 | Bareiss | 188/352 |
| 2009/0099748 A1* | 4/2009 | Watanabe et al. | 701/70 |
| 2009/0133973 A1* | 5/2009 | Shibata | 188/71.3 |
| 2009/0133975 A1* | 5/2009 | Gilles | 188/72.6 |
| 2009/0283371 A1* | 11/2009 | Winkler et al. | 188/72.6 |
| 2010/0072811 A1* | 3/2010 | Kondo et al. | 303/20 |
| 2010/0206677 A1* | 8/2010 | Shiraki | 188/325 |
| 2011/0042171 A1* | 2/2011 | Knechtges | 188/106 F |
| 2011/0224880 A1* | 9/2011 | Baehrle-Miller et al. | 701/70 |
| 2011/0278105 A1* | 11/2011 | Maron et al. | 188/72.1 |
| 2012/0205202 A1* | 8/2012 | Baehrle-Miller et al. | 188/106 P |
| 2012/0245816 A1* | 9/2012 | Blattert et al. | 701/70 |
| 2013/0001027 A1* | 1/2013 | Baehrle-Miller et al. | 188/106 F |
| 2013/0056315 A1* | 3/2013 | Bieltz et al. | 188/106 P |
| 2013/0211684 A1* | 8/2013 | Baehrle-Miller et al. | 701/70 |
| 2013/0226427 A1* | 8/2013 | Baehrle-Miller et al. | 701/70 |
| 2013/0231839 A1* | 9/2013 | Baehrle-Miller et al. | 701/70 |
| 2013/0338896 A1* | 12/2013 | Baehrle-Miller et al. | 701/70 |

FOREIGN PATENT DOCUMENTS

| | | |
|---|---|---|
| CN | 101341053 | 1/2009 |
| DE | 10 2006 011546 | 9/2007 |
| DE | 10 2009 028505 | 2/2011 |
| DE | 10 2009 029525 | 3/2011 |
| EP | 1 614 600 | 1/2006 |
| WO | WO 2011/032754 | 3/2011 |

* cited by examiner

METHOD FOR ADJUSTING THE CLAMPING FORCE EXERTED BY A PARKING BRAKE, REGULATING AND CONTROL APPLIANCE FOR CARRYING OUT SAID METHOD, AND VEHICLE PARKING BRAKE COMPRISING SUCH A CONTROL APPLIANCE

CROSS REFERENCE TO RELATED APPLICATIONS

The present application is the national stage entry of International Patent Application No. PCT/EP2011/061810, filed on Jul. 12, 2011, which claims priority to Application No. DE 10 2010 040 563.9, filed in the Federal Republic of Germany on Sep. 10, 2010.

FIELD OF INVENTION

The present invention relates to a method for adjusting the clamping force exerted by a parking brake in a vehicle.

BACKGROUND INFORMATION

Parking brakes in vehicles for continuous immobilization of the vehicle while at a standstill are part of the existing art. Such parking brakes can encompass an electric braking motor that acts, via a gear drive that is embodied, e.g., as a spindle drive, directly on the brake pistons at the hydraulic wheel brakes. The electric braking motor is dimensioned so that a clamping force can be generated which securely immobilizes the vehicle up to a specific gradient. For greater gradients, a hydraulic clamping force can additionally be generated via the hydraulic braking apparatus that encompasses the wheel brakes.

SUMMARY

An underlying object of the present invention is to make the engagement force or clamping force in the parking brake of a vehicle available in economical fashion, and at the same time to reduce the stress on the parking brake.

With the method according to the present invention, the clamping force in a parking brake for immobilizing a vehicle at a standstill can be made available economically while at the same time avoiding component overload, attributable in particular to a high hydraulic pressure, in the components of the parking brake. The parking brake encompasses on the one hand an electrical braking apparatus having an electric braking motor, and on the other hand a hydraulic braking apparatus having hydraulic wheel brake units, the electric brake motor acting directly on the brake piston of one or more wheel brake units that are a constituent of the parking brake. The hydraulic braking apparatus is preferably identical to the hydraulic vehicle brake with which the vehicle is decelerated in driving mode. An adjustable proportion of total clamping force can be respectively generated by way of the electrical and the hydraulic braking apparatus, the respective proportion being modifiably adjustable between zero and a maximum value.

Upon an actuation of the brake pedal by the driver, a pre-pressure is produced in the hydraulic braking apparatus, which pre-pressure can result, upon immobilization of the vehicle at a standstill and impingement on the brake pistons via electric brake motors, in a continuous component stress in the wheel brake units. In order to diminish the pressure and the component stress, provision is made in the context of the method according to the present invention that in the case of a pre-pressure exceeding a threshold pressure value, an inlet valve in the hydraulic braking apparatus, which valve is disposed between a brake cylinder and the wheel brake unit, is closed. The target clamping force that is to be established in order to immobilize the vehicle by way of the parking brake is achieved by actuating the electric-motor braking apparatus.

Closure of the inlet valve causes the hydraulic branch in the braking circuit between the inlet valve and the associated wheel brake unit to become hydraulically isolated, so that the pressure is not raised further even upon a further brake pedal actuation. The volume in this segment of the braking circuit is significantly reduced as compared with the braking circuit as a whole, including any accumulator units that may be present. Upon an actuation of the electric braking motor, the brake piston is displaced by the positioning motion of the motor, resulting in an increase in volume in the isolated branch of the braking circuit. This increase in volume has a comparatively large effect in the isolated branch, so that the pressure is correspondingly considerably decreased, and the component stress in the wheel brake unit is thus also diminished.

At the same time, the electrical braking apparatus ensures that the necessary target clamping force can be established. In supplementary fashion, an additional hydraulic clamping force is generated by way of the pressure in the hydraulic braking apparatus which becomes established as a result subsequently to the actuation of the electric braking motor and the increase in volume associated therewith. This force can optionally be taken into consideration when establishing the electrical clamping force, in such a way that the sum of the electrical and the hydraulic clamping force yields the target clamping force. According to a further useful exemplary embodiment, on the other hand, provision is made that in particular in the case where the threshold pressure value is exceeded, firstly the inlet valve is closed and then the electric-motor braking apparatus is actuated in order to generate the electrical clamping force, which is adjusted to the target clamping force. The pressure remaining in the hydraulic system brings about an additional force that goes beyond the target clamping force.

It may be useful also, in addition to the inlet valve that is located between the brake cylinder and the wheel brake unit, to close a switchover valve that is disposed in the braking circuit between the brake cylinder and the inlet valve. It is usual for two wheel brake units to be present in a braking circuit, for example two wheel brake units on one common axle or, in the case of a diagonal split, wheel brake units on different axles and in laterally opposite positions, the switchover valve being disposed upstream of the branching point into two branches each having one wheel brake unit. Upon closure of the switchover valve, both branches are decoupled from brake pedal actuation by the driver. In addition, the inlet valves are closed in order to significantly decrease the hydraulic volume that communicates with the wheel brake unit, so that a brake piston displacement as a result of an actuation of the electrical braking apparatus produces a comparatively large increase in volume, and thus a significant pressure reduction.

According to a further useful exemplary embodiment, provision is made that below the threshold pressure value, firstly an electrical clamping force is built up by way of an actuation of the electric braking motor, and then the inlet valve is closed. The hydraulic pressure in the braking system can thereby be utilized to build up a hydraulic clamping force. Advantageously, the magnitude of the electrical clamping force is determined from the difference between the target clamping force and the clamping force that can be established hydraulically. Because the pressure existing in the hydraulic system is not reduced with this operating mode, it is preferably carried out only below the threshold pressure value in order to avoid component overload.

In the context of determining the electrical clamping force to be established by way of the electric braking motor, it may be useful to effect a safety deduction from the hydraulic clamping force that is effective at the point in time of closure of the inlet valve. The proportion of electrical clamping force is higher because of the safety deduction, so that what is made available all in all is a resulting clamping force having a proportion of electrical and a proportion of hydraulic clamping force that is greater than without consideration of the safety deduction.

The parking brake is usually constituted by the two wheel brake units disposed on the rear axle of the vehicle. Each wheel brake unit has an inlet valve in the braking circuit associated with it; in order to carry out the method, each inlet valve of the wheel brake unit of the parking brake is closed when the threshold pressure value is exceeded.

If the target clamping force is established exclusively, and independently of the remaining hydraulic pressure, by way of the electric braking motor along, a nominal clamping force that corresponds to a defined gradient of, for example, 20% is generated therein.

The method according to the present invention is executed in a closed- or open-loop control device that is a constituent of the parking brake in the vehicle or that communicates with the parking brake or components of the parking brake. The closed- or open-loop control device can be a constituent of an electronic stability program (ESP) control device or can constitute an additional function of an ESP control device. If applicable, the control device is embodied as a separate unit that communicates with the ESP control device.

Further advantages and useful exemplary embodiments are described in the following with reference to the accompanying drawings.

DETAILED DESCRIPTION

Figure 1:
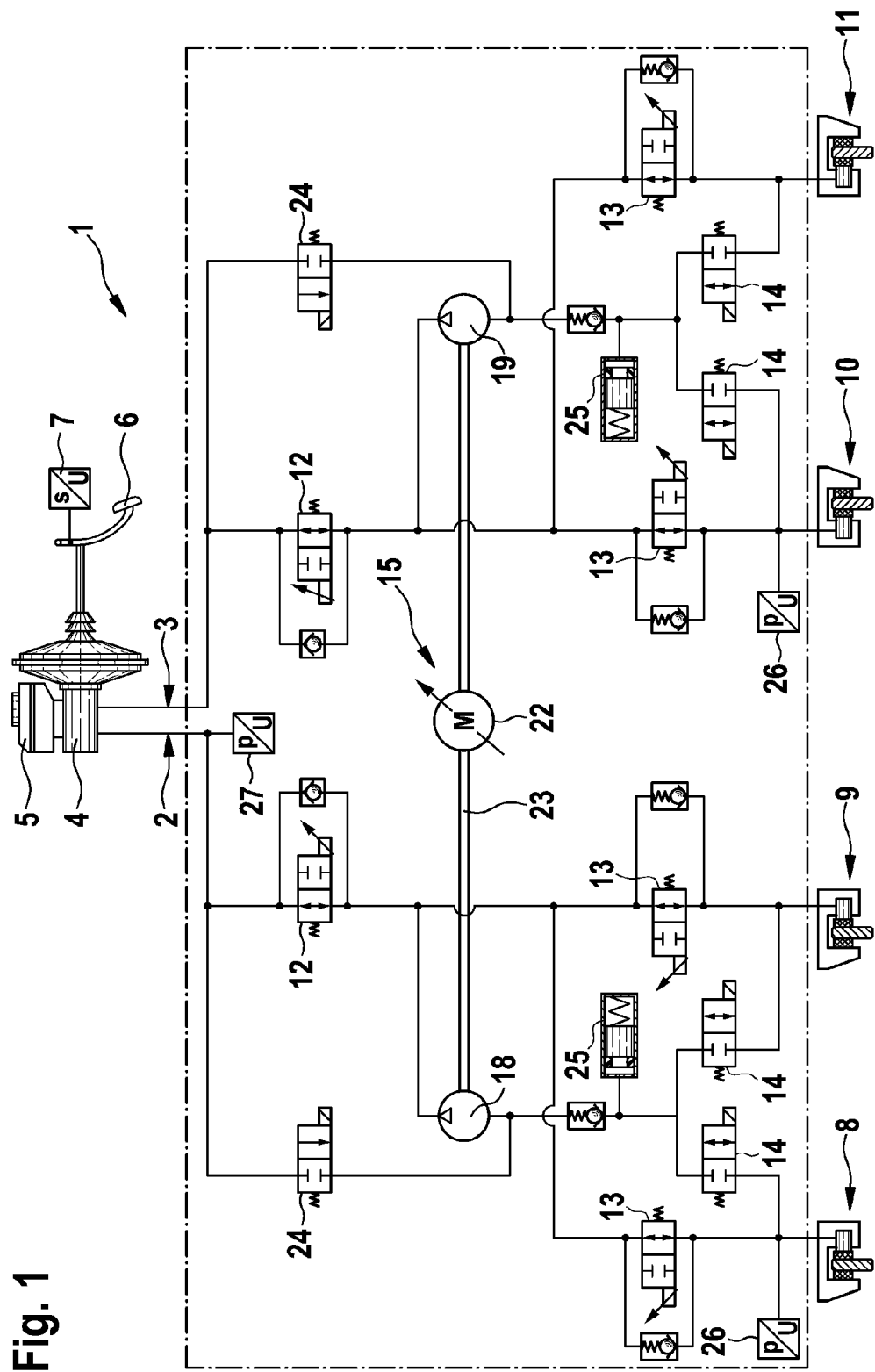
FIG. 1 is a hydraulic circuit diagram of a hydraulic braking apparatus in a vehicle, having a front-axle braking circuit and a rear-axle braking circuit.

The hydraulic circuit diagram according to FIG. 1 depicts a hydraulic braking apparatus 1 for a vehicle, having two diagonal braking circuits 2 and 3 for supplying a respective wheel braking apparatus 9, 10 on the front wheel and a respective wheel braking apparatus 8, 11 on the rear wheel with hydraulic brake fluid. Both braking circuits 2, 3 are connected to one common brake master cylinder 4 that is supplied with brake fluid via a brake fluid reservoir container 5. Brake master cylinder 4 is actuated by the driver via brake pedal 6. The pedal travel exerted by the driver is measured via a pedal travel sensor 7.

Disposed in each braking circuit 2, 3 is a switchover valve 12 that is located in the flow path between brake master cylinder 4 and the respective wheel brake units 8, 9, 10, and 11. Switchover valves 12 are open in their zero-current idle position. Each switchover valve 12 has associated with it a non-return valve, connected in parallel, through which flow can occur in the direction of the respective wheel brake unit.

Located between switchover valves 12 and the respective wheel brake units 8, 9, 10, 11 are inlet valves 13 that are likewise open at zero current. Inlet valves 13 also have non-return valves associated with them through which flow can occur in the opposite direction, i.e., from the wheel brake units toward brake master cylinder 4.

Each wheel brake unit 8, 9, 10, 11 furthermore has associated with it an outlet valve 14 that is closed at zero current. Outlet valves 14 are each connected to the intake side of a pump unit 15 that has a pump 18, 19 in each braking circuit 2, 3. The pump unit is equipped with an electric drive motor or pump motor 22 that actuates the two pumps 18 and 19 via a shaft 23. The delivery side of pump 18, 19 is connected respectively to a conduit segment between switchover valve 12 and the two inlet valves 13 per braking circuit 2, 3.

The intake sides of pumps 18 and 19 are each connected to a main switching valve 24 that is hydraulically connected to brake master cylinder 4. In the context of a vehicle-dynamics control intervention, main switching valves 24 (closed in the zero-current state) can be opened for a rapid buildup of brake pressure, so that pumps 18 and 19 draw hydraulic fluid directly out of brake master cylinder 4. This brake pressure buildup can be carried out independently of an actuation of the braking apparatus by the driver. Pump unit 15 having the two individual pumps 18 and 19, the electric pump motor 22, and shaft 23 is part of a driver assistance system; in particular, it constitutes an electronic stability program (ESP).

Located between outlet valves 14 and the intake side of pumps 18 and 19, for each braking circuit 2, 3, is a hydraulic accumulator 25 that serves for temporary accumulation of brake fluid that is discharged through outlet valves 14 from wheel brake units 8, 9, 10, 11 during a driving-dynamics intervention. Associated with each hydraulic accumulator 25 is a non-return valve that opens in the direction toward the intake sides of pumps 18, 19.

For pressure measurement, a respective pressure sensor 26 is located in each braking circuit 2, 3 in the region of wheel brake units 8, 9, 10, 11. A further pressure sensor 27 (pre-pressure sensor) is disposed in braking circuit 2 adjacent to brake master cylinder 4.

Hydraulic braking apparatus 1 depicted in FIG. 1 is a constituent of the vehicle brake, and furthermore forms part of a parking brake for immobilizing the vehicle at a standstill. The parking brake also encompasses, in addition to hydraulic braking apparatus 1, an electric-motor braking apparatus having electric braking motors that are disposed on wheel brake units 8 and 11 on the respective diagonals, and that impinge upon the hydraulic brake cylinders of wheel brake units 8 and 11.

Figure 2:
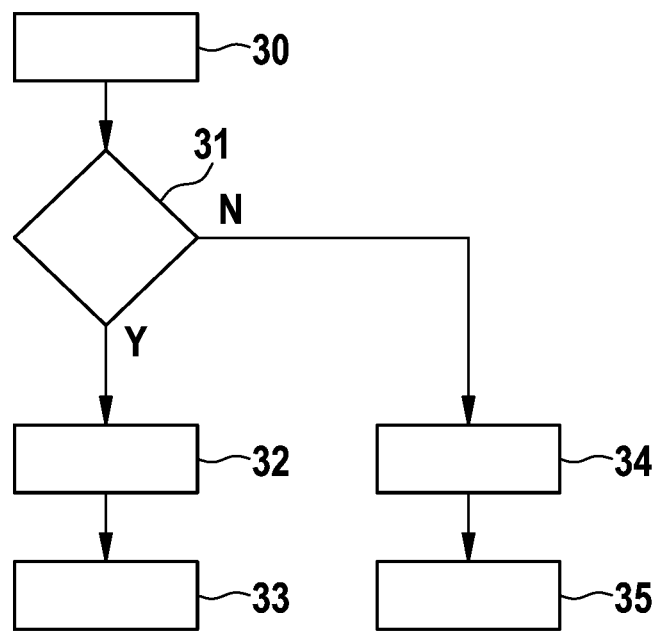
FIG. 2 is a flow chart for execution of the method for adjusting a clamping force exerted by a parking brake.

FIG. 2 is a flow chart for execution of the method for adjusting the parking brake, which latter also encompasses rear-axle wheel brakes 8 and 11 of braking circuits 2 and 3 of hydraulic braking apparatus 1 according to FIG. 1. In the first method step 30, firstly the hydraulic pre-pressure $p_{h,pre}$, traceable to a brake pedal actuation by the driver, is identified by way of pre-pressure sensor 27 in the braking apparatus. In the next method step 31, the pre-pressure $p_{h,pre}$ is compared with a threshold pressure value $p_{h,100}$ that is, for example, 100 bar. If the pre-pressure $p_{h,pre}$ exceeds the threshold pressure value $p_{h,100}$, measures are then taken to decrease the pressure in order to avoid component damage in the wheel brake units.

If the threshold pressure value $p_{h,100}$ is exceeded in query 31, execution follows the "Y" (yes) branch to the next method step 32, according to which firstly switchover valves 12 of braking circuits 2 and 3, and the two inlet valves 13 of the rear wheel brakes, are closed. Closure of switchover valve 12 results in independence in braking circuits 2 and 3 from further actuations, in particular release, of brake pedal 6. Closure of the two inlet valves 13 in the rear-axle braking circuit causes the respective branches between each inlet valve 13 and the associated respective wheel brake unit 8 and 11 to become hydraulically isolated. The result is that only greatly diminished hydraulic volumes are present in wheel brake units 8 and 11.

According to the next method step 33, the electrical braking apparatus is actuated by the fact that the electric braking motor in each respective wheel brake unit 8 and 11 exerts a positioning force on the respective brake piston. The volume available for the fluid is thereby increased, which is accompanied by a significant pressure decrease in the respective wheel brake units 8, 11. The desired target clamping force $F_{N,tgt}$ can be established in each wheel brake unit 8, 11 by way of the electric braking motor.

If the query in method step 31 indicates that the pre-pressure $P_{h,pre}$ in braking circuits 2 and 3 does not exceed the threshold pressure value $p_{h,100}$, execution follows the "N" (no) branch to method steps 34 and 35. In method step 34, firstly an actuation of the electric braking motor occurs at each wheel brake unit 8, 11 of the rear-axle braking circuit; switchover valve 12 and the two inlet valves 13 of wheel brakes 8 and 11 initially remain open. The result is that the hydraulic pre-pressure $p_{h,pre}$ present in the rear-axle braking circuit is also effective at wheel brake units 8, 11. The total clamping force is made up of the clamping force $F_{N,el}$ made available from electric motors and the hydraulic braking force $F_{N,h}$ in wheel brake units 8, 11. The electrical clamping force $F_{N,el}$ is ascertained variably in this context, as a function of the pre-pressure $p_{h,pre}$ that currently exists and of the hydraulic clamping force corresponding to the pre-pressure. For a given target clamping force $F_{N,tgt}$, the electrical clamping force $F_{N,el}$ is determined from the difference between the target clamping force $F_{N,tgt}$ and hydraulic clamping force $F_{N,h}$.

In the next method step 35, switchover valves 12 and the two inlet valves 13 of rear-wheel brakes 8 and 11 are closed once the electrical clamping force $F_{N,el}$ is established. Further brake pedal actuations thus have no further effect on the wheel brake units.

It may be useful, in the context of ascertaining the electrical clamping force $F_{N,el}$ in method step 34, to effect a safety deduction from the value of the hydraulic clamping force $F_{N,h}$, for example in the amount of 20 bar from the currently existing pre-pressure $p_{h,pre}$, resulting in a correspondingly higher proportion of electrical clamping force $F_{N,el}$ when the target clamping force $F_{N,tgt}$ is established.

What is claimed is:

1. A method for adjusting a clamping force exerted by a parking brake, the parking brake comprising an electric-motor braking apparatus that encompasses an electric braking motor, and a hydraulic braking apparatus, the electric braking motor impinging upon a brake piston of a hydraulic wheel brake unit of the hydraulic braking apparatus, the method comprising:
    responsive to detecting that a pre-pressure existing in the hydraulic braking apparatus is greater than a threshold pressure value:
        closing an inlet valve that is disposed in a braking circuit of the hydraulic braking apparatus between a brake cylinder and the wheel brake unit, and
        after closing the inlet valve, actuating the electric-motor braking apparatus such that a target clamping force is established.

2. The method according to claim 1, further comprising:
responsive to detecting that the pre-pressure is greater than the threshold pressure value, closing a switchover valve disposed in the braking circuit, said switchover valve being disposed in the braking circuit between the brake cylinder and the inlet valve.

3. The method according to claim 1, further comprising:
responsive to detecting that the pre-pressure is greater than the threshold pressure value, subsequent to the closing of the inlet valve, adjusting the electric-motor braking apparatus in order to generate an electrical clamping force.

4. A method for adjusting a clamping force exerted by a parking brake, the parking brake comprising an electric-motor braking apparatus that encompasses an electric braking motor, and a hydraulic braking apparatus, the electric braking motor impinging upon a brake piston of a hydraulic wheel brake unit of the hydraulic braking apparatus, the method comprising:
    performing a control process according to which:
        for a case in which a pre-pressure existing in the hydraulic braking apparatus exceeds a threshold pressure value, the process causes (a) an inlet valve that is disposed in a braking circuit of the hydraulic braking apparatus between a brake cylinder and the wheel brake unit to be closed, and (b) a target clamping force to be established by actuation of the electric-motor braking apparatus; and
        for a case in which the pre-pressure existing in the hydraulic braking apparatus is below the threshold pressure value, the process causes (a) an electrical clamping force to be built up, and (b) the inlet valve to be closed subsequent to the buildup of the electrical clamping force.

5. The method according to claim 4, wherein a magnitude of the electrical clamping force is adjusted so that a sum of the electrical clamping force and a hydraulic clamping force that is effective at a point in time when the inlet valve is closed yields the target clamping force.

6. The method according to claim 5, wherein in a context of ascertaining the electrical clamping force to be established, a safety deduction is effected from the hydraulic clamping force that is effective at the point in time of closure of the inlet valve.

7. The method according to claim 1, wherein two inlet valves are provided, which are respectively disposed in a branch of the braking circuit each having a wheel brake unit, and which are closed in response to the detecting that the pre-pressure is greater than the threshold pressure value.

8. The method according to claim 1, wherein the electrical clamping force generated in the electric-motor braking apparatus is adjusted to a nominal value that corresponds to a defined gradient.

9. A closed- or open-loop control device for adjusting a clamping force exerted by a parking brake, the parking brake comprising an electric-motor braking apparatus that encompasses an electric braking motor, and a hydraulic braking apparatus, the electric braking motor impinging upon a brake piston of a hydraulic wheel brake unit of the hydraulic braking apparatus, the control device comprising an arrangement configured to perform the following for the adjusting:
    responsive to detecting that a pre-pressure existing in the hydraulic braking apparatus is greater than a threshold pressure value:
        close an inlet valve that is disposed in a braking circuit of the hydraulic braking apparatus between a brake cylinder and the wheel brake unit, and
        after closing the inlet valve, actuate the electric-motor braking apparatus such that a target clamping force is established.

10. A parking brake in a vehicle having a closed- or open-loop control device for adjusting a clamping force exerted by a parking brake, the parking brake comprising an electric-motor braking apparatus that encompasses an electric braking motor, and a hydraulic braking apparatus, the electric braking motor impinging upon a brake piston of a hydraulic wheel brake unit of the hydraulic braking apparatus, the parking brake comprising:
 a control device that is configured to perform the following for the adjusting:
  responsive to detecting that a pre-pressure existing in the hydraulic braking apparatus is greater than a threshold pressure value:
   close an inlet valve that is disposed in a braking circuit of the hydraulic braking apparatus between a brake cylinder and the wheel brake unit, and
   after closing the inlet valve, actuate the electric-motor braking apparatus such that a target clamping force is established.

\* \* \* \* \*